Dec. 31, 1957  J. H. POWERS  2,818,134

ELECTROSTATIC GAS FILTER

Filed July 20, 1956

INVENTOR.
JAMES H. POWERS
BY
HIS ATTORNEY ated Dec. 31, 1957

2,818,134

ELECTROSTATIC GAS FILTER

James H. Powers, Anchorage, Ky., assignor to General Electric Company, a corporation of New York Application July 20, 1956, Serial No. 599,200

2 Claims. (Cl. 183—7)

The present invention relates to an electrostatic gas filter and more particularly to a means for connecting the electrodes of an electrostatic filter to a source of electrical power.

It is an object of the present invention to provide an electrostatic gas filter including an improved electrical connector for connecting the electrodes of an electrostatic filter to a source of electrical potential.

More specifically, it is an object of this invention to provide an electrostatic filter having an improved electrical connector whereby adjacent electrodes of a series of parallel, spaced electrodes are charged to different potentials, thereby creating an electrostatic field between the adjacent electrodes.

It is a further object of this present invention to provide an improved means for connecting the electrodes of an electrostatic filter which can be easily connected to the electrodes and is of compact and low cost construction.

Further objects and advantages of the invention will become apparent as the following description proceeds, and the features of novelty which characterize the invention will be pointed out with particularity in the claims annexed to and forming a part of this specification.

In accordance with the present invention there is provided an electrostatic filter for filtering particles from a gas stream comprising an insulating frame member having opposed side walls and a plurality of electrodes arranged laterally across the face of the frame member and supported upon the side walls of the member. Adjacent electrodes have opposite ends thereof extending a short distance through the respective side walls, such that alternate electrodes all have the same end extending through the same side wall of the frame member. A spring wire connector passing over and under the ends of the electrodes extending through one side wall of the frame member provides a means for connecting the alternate electrodes to a source of charging potential. As a further aspect of the invention, cover means are provided which enclose the extending ends of the electrodes and force the spring wire connectors inwardly against their respective side walls thereby preventing the connectors from becoming disengaged from the electrodes around the ends thereof.

For a better understanding of the invention, reference may be made to the accompanying drawing in which Fig. 1 is a plan view of the present invention with portions of the filter media broken away to show the remaining structure of the filter;

Figure 1:
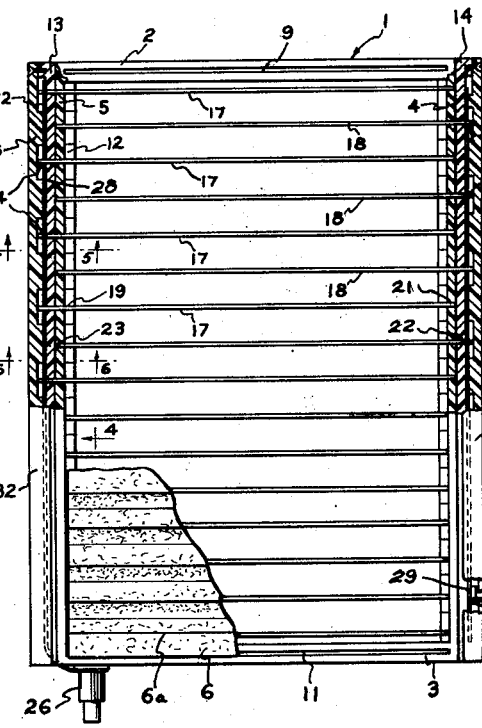
Figure 4:
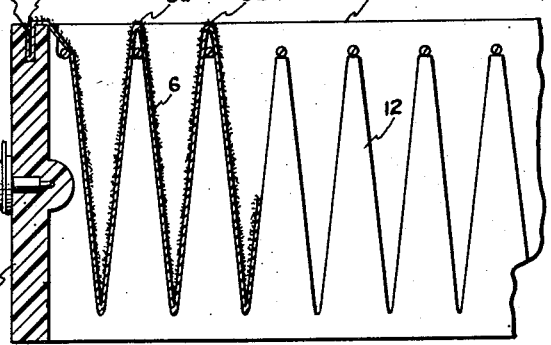
Fig. 4 is a partial elevation taken along line 4—4 of Fig. 1 and shows the arrangement of the filter medium and electrodes within the frame member.

In Fig. 1 of the drawing there is shown an electrostatic gas filter comprising an insulating frame member 1 having ends 2 and 3 and opposed side walls 4 and 5. The side walls 4 and 5 support the ends of a plurality elongated electrodes in parallel, spaced relationship and disposed substantially in the same plane. A dielectric filter media 6 comprising one or more sheets of fibrous material folded into an accordion or zig-zag fold is at least partially supported by the electrodes and is arranged to fill the internal area within the frame member 1. The filter media 6 comprises one or preferably more than one sheet of paper and the ends 7 of the filter sheets are anchored by insertion into suitable slots 9 and 11 in the ends 2 and 3 of the frame member. The side edges of the filter media are supported by a plurality of triangularly-shaped projections 12 (best seen in Fig. 4) formed upon the side walls 4 and 5. In Fig. 1 it will be seen that the filter media entirely overlies the electrodes which are disposed across the frame member 1. The electrodes are on the downstream side of the filter media 6 during operation of the filter, and lie closely adjacent the upstream ridges 6a of the media.

The opposite side walls 4 and 5 are each provided, closely adjacent the front edge thereof, with elongated lip members 13 and 14 having a generally U-shaped cross section, the lip members being attached at their bight portion 15 and 15a to the respective side walls, with the legs 16 of the U-shaped lip members extending outwardly from the side walls.

The electrode arrangement comprises a first series of electrodes 17 and a second series of electrodes 18 which in operation of the filter are maintained at different potentials or opposite polarities. For example, one set or series of electrodes such as electrodes 17 are charged with a high voltage while the other set 18 is grounded. By this arrangement in which the adjacent electrodes in the coplanar electrode arrangement are at different electrical potentials, there is created an electrostatic field having its highest potential in or across the plane of the electrodes.

The first series of electrodes 17 is supported by a plurality of holes 19 passing completely through the side wall 5 and the bight portion 15 of the lip member 13 and an opposite group or series of holes 21 extending through side wall 4 but not passing through the bight portion 15a of the lip member 14. The second series of electrodes 18 is supported by a group of holes 22 passing completely through the side wall 4 and the bight portion 15a of the lip member 14 and an opposite set of holes 23 extending through the side 5 but not passing through the bight portion 15 of the lip member 13. As can be seen from Fig. 1 all of the electrodes 17 of the first series have end portions 24 protruding a short distance through the side wall 5 and between the legs 16 of the lip member 13 and similarly the electrodes 18 of the second series have end portions 25 protruding completely through the side wall 4 and between the legs 16 of the lip member 14. The protruding ends of the electrodes are preferably spaced equidistant between the legs 16 of the lip members.

In order to provide a source of high voltage, a high voltage terminal 26 is provided upon the end 3 of the frame member. During the operation of the electrostatic filter this high voltage terminal 26 is in electrical contact with a suitable source of high voltage direct current. Upon sidewall 4 there is provided a low voltage terminal or ground terminal 27, which in the present embodiment of the invention is disposed within the open portion of the U-shaped lip member 14. It is obvious, however, that the ground terminal could be positioned at any other convenient place, such as on the end 3 in the same manner as the high voltage terminal 26.

Figure 2:
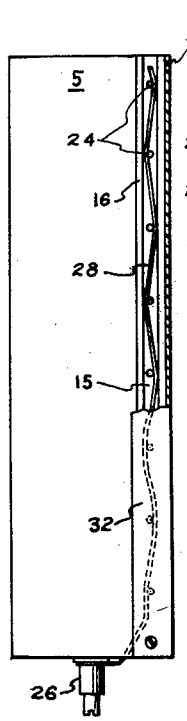
Fig. 2 is an elevation view with a portion of the cover means broken away to show the arrangement of the spring wire connector and the electrode ends.

In order to provide suitable electrical connections between the series of electrodes 17 and the high voltage terminal 26 and between the series of electrodes 18 and the low voltage or ground terminal 27, there are provided connecting means in the form of straight spring wire connectors 28 and 29. As can be seen in Fig. 2, spring wire connector 28 is attached to the high voltage terminal 26 at one end and is passed succesively over and under the ends 24 of the first series of electrodes 17 extending through the side wall 5. Thus the spring wire is forced during placement to assume a serpentine configuration and is biased by the resiliency of the spring wire into electrical contact with the ends 24 of the electrodes 17. As can best be seen in Fig. 1, the spring wire connector 29 is in electrical contact with the terminal base 31 which forms a part of the ground terminal 27. The spring wire connector 29 then passes successively over and under the ends 25 of the series of electrodes 18 extending through the side wall 4 of the frame member and connects all these electrodes to the ground terminal. The spring wire connectors 28 and 29 are slid into position between the legs 16 of the respective U-shaped lip members and lie closely adjacent the bight portions of the lip members.

Figure 3:
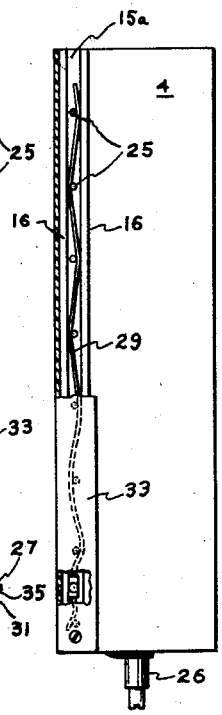
Fig. 3 is an elevation view similar to Fig. 2 showing the connector and electrode arrangement on the other side wall of the filter frame and the relationship of the ground to the connector.
Figure 5:
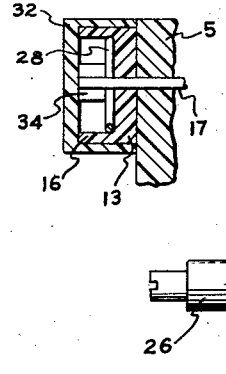
Fig. 5 is a cross sectional view taken along line 5—5 of Fig. 1 illustrating the arrangement between the electrode end cover and the spring wire connector.
Figure 6:
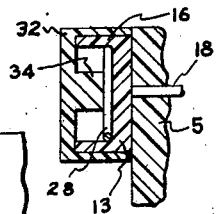
Fig. 6 is a cross sectional view taken along line 6—6 of Fig. 1 and showing the spring wire connector being held in place by the electrode cover.

The tension in the spring wire connectors 28 and 29 makes them seek to straighten out and as this may cause the connectors to become disengaged from the electrodes around the ends thereof, there are provided retaining members or cover means 32 and 33 which cover the ends of the electrodes extending through the side walls and prevent disengagement of the spring wire connectors from the electrodes around the ends thereof. Preferably these cover members are made of an insulating material and thereby provide a suitable insulation around the ends of the electrodes, preventing any contact with the electrodes except through the spring wire connectors 28 and 29. As can be seen in Figs. 5 and 6, the retaining members have a generally channel-shaped configuration and slip over the extending legs 16 of the lip members 13 and 14. A plurality of lugs 34 on the inner portion of the channel and spaced along the channel at points between the extending ends of the electrodes force the spring wire connectors 28 and 29 inwardly toward the side walls against the bight portions 15 and 15a of the lip members 13 and 14 respectively. From Figs. 1 and 3 it can be seen that cover means 33 is provided with an opening or slot 35 through which the ground terminal 27 extends, to permit a grounding connection to be made through this terminal to the second series of electrodes 18.

By the present invention there has been provided an improved connector means whereby adjacent electrodes in a series of spaced electrodes may be alternately charged with electrical potentials of different magnitude or polarity. Moreover this connector means is of simple and compact construction and may be easily and cheaply manufactured.

While in accordance with the Patent Statutes there has been described what at present is considered to be the preferred embodiment of this invention, it will be obvious to those skilled in the art that various changes and modifications may be made therein without departing from the invention and it is, therefore, the aim of the appended claims to cover all such changes and modifications as fall within the true spirit and scope of the invention.

What I claim as new and desire to secure by Letters Patent of the United States is:

1. An electrostatic filter for filtering particles from a gas stream comprising an insulating open faced frame member having ends and side walls, a sheet of porous dielectric filtering media having zig-zag folds therein disposed across the frame member with the ridges thereof alternately facing upstream and downstream, a plurality of spaced parallel electrodes disposed across said frame member on the downstream side of said filtering media and closely adjacent the upstream ridges of said filtering media, said electrodes being supported by said side walls with adjacent electrodes having opposite ends thereof extending a short distance through said side walls such that alternate electrodes have ends extending a short distance through the same side walls, and means for charging said adjacent electrodes extending through said opposite side walls to different potentials, said means comprising a pair of terminals at different potentials and a pair of spring wire connectors, each of said connectors being attached to one of said pair of terminals and passing successively over and under the ends of said electrodes extending through only one of said side walls to develop spring tension in said spring connectors sufficient to maintain said connectors in good electrical contact with said electrodes whereby adjacent electrodes are charged to different potentials, and cover means for covering the ends of said electrodes extending through said side wall for preventing said spring wires from becoming disengaged from said electrodes around the ends thereof.

2. The filter set forth in claim 1 in which said cover means is in the form of a chanel-shaped member having lugs spaced along said channel at points along said channel intermediate said extending ends of said electrodes, said lugs forcing said spring wire against said side wall thereby preventing said spring wire from becoming disengaged from said electrodes around the ends thereof.

References Cited in the file of this patent
UNITED STATES PATENTS

| | | |
|---|---|---|
| 1,992,974 | Thompson | Mar. 5, 1935 |
| 2,297,601 | Williams | Sept. 29, 1942 |
| 2,643,222 | Cox | June 23, 1953 |